United States Patent [19]

Horie

[11] 4,119,180
[45] Oct. 10, 1978

[54] DISC BRAKE FRICTION PAD GUIDE AND SUPPORT STRUCTURE

[75] Inventor: Koji Horie, Toyota, Japan

[73] Assignee: Toyota Jidosha Kogyo Kabushiki Kaisha, Japan

[21] Appl. No.: 821,629

[22] Filed: Aug. 4, 1977

[30] Foreign Application Priority Data

Aug. 27, 1976 [JP] Japan .............................. 51-101714

[51] Int. Cl.² ........................................... F16D 65/02
[52] U.S. Cl. .................................................. 188/73.5
[58] Field of Search .................... 188/71.1, 73.1, 73.3, 188/73.5, 72.4, 72.5, 205 A

[56] References Cited

U.S. PATENT DOCUMENTS

| | | | |
|---|---|---|---|
| 1,592,273 | 7/1926 | Kelly | 188/250 B |
| 3,402,789 | 9/1968 | Biabaud | 188/73.6 |
| 3,416,634 | 12/1968 | Swift | 188/73.3 |
| 3,656,589 | 4/1972 | Kawabe et al. | 188/72.5 |
| 3,920,104 | 11/1975 | Hoffmann | 188/73.1 X |

FOREIGN PATENT DOCUMENTS 1,335,552 10/1973 United Kingdom ................... 188/73.3

Primary Examiner—George E. A. Halvosa
Attorney, Agent, or Firm—Kane, Dalsimer, Kane, Sullivan and Kurucz

[57] ABSTRACT

A disc brake including a torque bearing member which slidably supports an inner pad and an outer pad which are positioned on the opposite sides of a brake disc, respectively. The torque bearing member has outer pad guide portions, each of which establishes surface-to-surface contact with the outer pad. As a result, wear of the outer pad guide portions is improved despite the frequent sliding movement of the outer pad along the outer pad guide portions, thus extending the service life of a disc brake.

1 Claim, 4 Drawing Figures

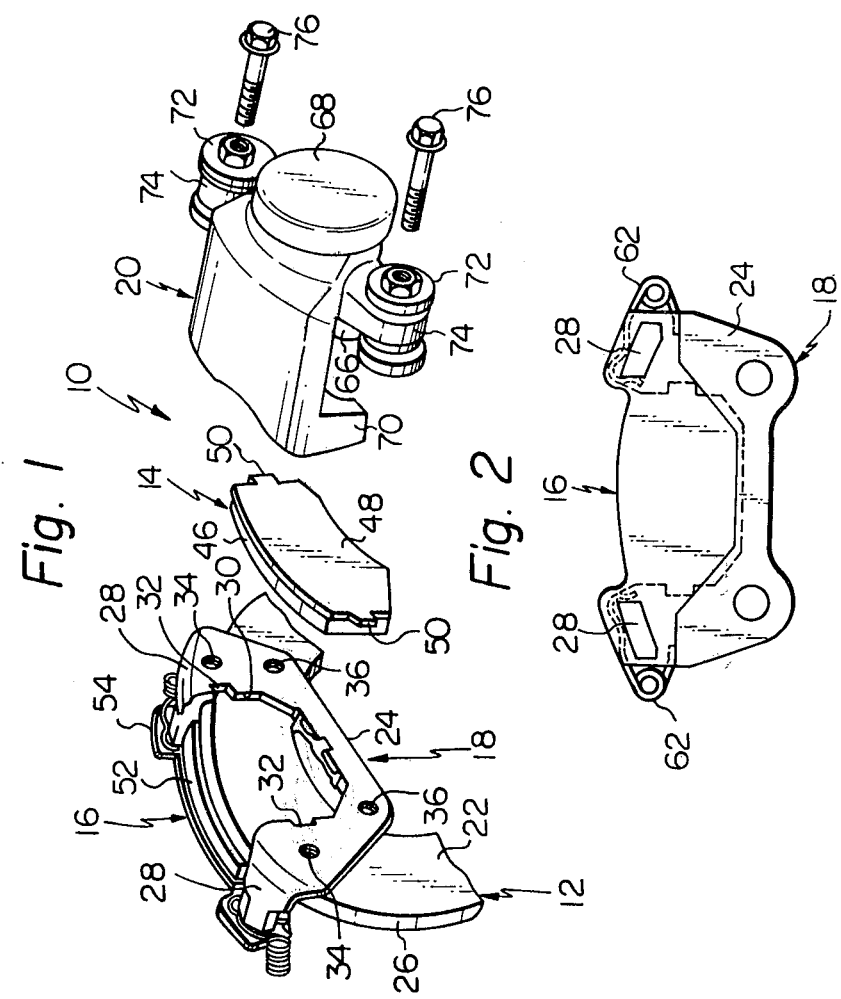

DISC BRAKE FRICTION PAD GUIDE AND SUPPORT STRUCTURE

BACKGROUND OF THE INVENTION

This invention relates to a disc brake, and more particularly to a disc brake of a floating-caliper type.

DESCRIPTION OF THE PRIOR ART

Hitherto, in a disc brake of a floating-caliper type, an inner pad and an outer pad positioned on the opposite sides of a brake disc, respectively, and a caliper for forcing the both pads against a brake disc have been slidably supported along the rotational axis of the disc brake by a torque bearing member secured to a frame of a vehicle body. More particularly, the torque bearing member includes a fixed portion having an inner pad guide groove adapted to guide the inner pad on one side of the disc brake, and a pair of outer pad guide portions having a circular cross section and extending from one side of the fixed portion towards the other side of the disc brake.

In this respect, the outer pad is slidably supported by its guide portions on the other side of the disc brake, with the guide portions being supported in circular holes defined in the outer pad.

The inner pad supported or guided by the inner pad guide groove, and the outer pad supported by the outer pad guide portions are forced against the brake disc from the opposite sides thereof under the action of a piston in a caliper which is supported by the torque bearing member, thereby exerting a brake action on the brake disc. Upon braking action, the both pads bear high torsional moments or torque. In this respect, the torque acting on the inner pad is transmitted through the inner pad guide groove, which establishes surface-to-surface contact with the side face of the inner pad, to the fixed portion of a torque bearing member. On the other hand, the torque acting on the outer pad is transmitted through circular holes in the outer pad to the outer pad guide portions having a circular cross section and extending through the aforesaid circular holes.

However, the outer pad guide portions of the torque bearing member in a prior art disc brake suffer from a disadvantage in that the guide portions establish line-to-line contact with the outer pad supported by the guide portions, unlike the surface-to-surface contact between the aforesaid fixed portion and the inner pad. For this reason, a large force or stress is concentrated on the outer pad guide portions of the torque bearing member along a line in parallel with an axis of rotation of the brake disc, upon braking action, thus resulting in premature or local wear of the abutting or contacting portions of the outer pad and outer pad guide portions. The wear of the abutting portions of the outer pad and outer pad guide portions impairs the smooth operation of the outer pad relative to the outer pad guide portions, as well as lowers the durability of the disc brake.

SUMMARY OF THE INVENTION

It is accordingly an object of the present invention to provide a disc brake which insures a smooth operation and a long service life.

According to the present invention, there is provided a disc brake of the floating-caliper type which includes a brake disc having an axis of rotation, inner pad and outer pad positioned on the opposite sides of the brake disc, respectively, and a torque bearing member which slidably supports the both pads, and supports a caliper including a piston adapted to force the both pads against the brake disc. More particularly, the aforesaid torque bearing member includes a pair of outer pad guide portions which slidably support the outer pad along the axis of rotation of the brake disc, and the outer pad is provided with a pair of through-holes which admit or support the outer pad guide portions. In addition, the aforesaid pair of outer pad guide portions are each formed with an outer surface and a bottom surface forming a right angle therebetween and extending along the axis of rotation of the brake disc, while the aforesaid pair of through-holes have walls adapted to contact the aforesaid outer surface and bottom surface.

According to another aspect of the present invention, there is provided a pair of springs positioned between the outer pad and the outer pad guide portions for biasing the outer pad.

According to the present invention, the outer pad is slidably supported by a pair of outer pad guide portions on their outer and bottom surfaces, so that there may be established surface-to-surface contact between the outer pad and the outer pad guide portions. As a result, upon braking action of the disc brake, a high torque acting on the outer pad is borne through the medium of the aforesaid abutting surfaces by the outer pad guide portions of the torque bearing member, in a manner that the forces thus acting on the abutting surfaces of the outer pad and outer pad guide portions may be dispersed rather than concentrated, as in the prior art disc brake, thereby preventing premature or local wear of the outer pad and outer pad guide portions.

In addition, the aforesaid pair of springs act on the outer pad to bias same, so that the outer pad is urged against the outer pad guide portions uniformly. This avoids the so-called rattling of the outer pad relative to the outer pad guide portions, and allows uniform contact of the outer pad with the outer pad guide portions, thus preventing local or premature wear of the abutting surfaces of the outer pad and the outer pad guide portions.

In this manner, the abutting surfaces of the outer pad and outer pad guide portions adapted to slidably support the outer pad are not subjected to premature or local wear, insuring a smooth operation and long service life for the disc brake. dr

BRIEF DESCRIPTION OF THE DRAWINGS

These and other objects and features of the present invention will be apparent from a reading of the ensuing portion of the specification in conjunction with the accompanying drawings which indicate an embodiment of the invention, in which:

FIG. 1 is an exploded, perspective view of a disc brake according to the present invention;

FIG. 2 is a side elevation of a torque bearing member of FIG. 1;

DESCRIPTION OF THE PREFERRED EMBODIMENTS

Figure 3:
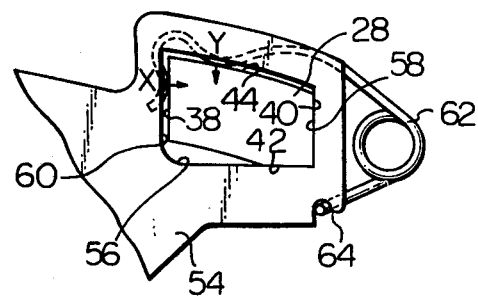
FIG. 3 is an enlarged view of an outer pad guide portion of a torque bearing member shown in FIG. 2.

Referring now to FIG. 1, a disc brake 10 according to the present invention includes an inner pad 14 and outer pad 16 which are positioned on the opposite sides of a brake disc 12 having an axis of rotation (not shown), respectively, a torque bearing member 18 which slidably supports the both pads 14, 16, and a caliper 20 supported by the torque bearing member 18.

The torque bearing member 18 includes a fixed portion of a 'U' shape, which is positioned in opposed relation to a side surface 22 of the disc brake 10, and a pair of outer pad guide portions 28 extending from the top edges of the fixed portion over the outer peripheral edge of the brake disc 12 along the axis of rotation of the brake disc 12 to the position beyond the other side surface 26 of the brake disc 12. Provided in the fixed portion 24 is an inner pad guide groove 30 serving as inner pad guide portion, which slidably supports the inner pad 14 along the axis of the brake disc 12. Further provided in the opposed walls of the inner pad guide groove are recesses 32. In addition, screw holes 34, 36 are provided in the fixed portion 24 in the upper and lower opposite side portions of the fixed portion 24.

As shown in FIG. 2, the outer pad guide portions 28 extend in the direction at a right angle to the fixed portion but in parallel relation to each other. As shown in an enlarged view in FIG. 3, the outer pad guide portions 28 have substantially rectangular cross sections defined by parallel inner and outer side surfaces 38, 40, and a bottom surface 42 extending at a right angle to the side surfaces 38, 40, respectively. In the embodiment as shown, a top surface 44 and part of the bottom surface 42 are formed of curved surfaces. Alternatively, the respective side surfaces of the outer pad guide portions 28, other than the outer side surface 40 and bottom surface 42, may be provided in the form of curved surfaces, as required.

The torque bearing member 18 may be made according to casting. However, the torque bearing member made according to casting, in general, is brittle and heavy in weight, and in addition, surface finishing is required therefor. Accordingly, it is preferable that the torque bearing member 18 be made according to a sheet-metal forming technique, i.e., by bending a high tension rolled metal plate having a contour, into which the torque bearing member is developed, in a manner that the fixed portion is turned at a right angle to the outer pad guide portions.

Upon bending, it is preferable that a bend radius of a corner formed between the fixed portion 24 and the outer pad guide portions 28 be no more than the thickness of the plate, because the peripheral edge of the brake disc 12 is to be positioned inwardly of the aforesaid corner. Meanwhile, difficulty is confronted with bending of a high tension rolled metal plate, without causing damages, such as cracking, on the outer surface of a bend, when formed at an inner bend radius no more than the thickness of a plate. However, this may be successfully accomplished by using a press machine, in which, after the aforesaid metal plate has been preliminarily bent in a given position at an inner bend radius approximating the thickness of the plate, the plate is bent through an angle of 90° at an inner bend radius less than the thickness of the plate. In this latter bending, the outer layer of the bend thus preliminarily formed is held so as not to cause elongation, with the opposite side-edges of a plate being held by abutments. In this manner, a plate may be bent at a bend radius no more than the thickness of a plate with ease, without causing a damage thereon.

More specifically, in the latter bending with the outer layer of the bend of a plate being held so as not to cause elongation, with the opposite side-edges of the plate being held by abutments, respectively, the neutral line of expansion and compression in the plate is not biased inwardly of the bent, and the elongation of the outer layer of the plate is suppressed. The torque bearing member 18 thus formed is lighter in weight and higher in durability, as compared with that which is made according to casting.

As has been described earlier, the torque bearing member 18 is rigidly secured to a frame (not shown) of a vehicle body in a manner that the fixed portion 24 may be opposed to but in parallel with the side surface of the brake disc 12, by means of screw holes 36 and bolts (not shown) threaded therein. The inner pad or friction means 14 guided by the inner pad guide groove 30 of the torque bearing member 18 includes friction material 46 and a backing plate 48 supporting the friction material 46, as shown in FIG. 1. The backing plate 48 is formed with a pair of projecting portions 50 on the opposite sides thereof. The inner pad 14 is received in the inner pad guide grooves 30, with the projecting portions 50 being in engagement with recesses 32 defined in the fixed portion 24, so that the inner pad 14 may be slidably supported by the fixed portion 24 along an axis of rotation of the brake disc 12.

The outer pad or outer friction means 16 includes a friction material 52 and a backing plate 54 similar to those of the inner pad 14. The backing plate 54 is provided with a pair of through-holes 56 adapted to admit the outer pad guide portions 28 therein, on the opposite sides of the backing plate 54.

The through-holes 56 of substantially rectangular shape are each defined by wall surfaces opposed to the side surfaces 38, 40, top surface 44, and bottom surface 42 of the outer pad guide portions 28 substantially in parallel relation thereto. An outer wall 58 of the throughhole 56 abuts the outer side surface 40 of the outer pad guide portion 28, an inner wall 60 of the through-hole 56 is spaced a minute distance from the inner side surface 38 of the guide portion 28, so that the outer pad 16 is slidably supported by the outer pad supporting portions 28.

A pair of torsion coil springs 62 are positioned between the outer pad 16 and the outer pad guide portion 28. One end of each of torsion coil spring 62 is hooked by a cutaway portion 64 provided in the backing plate 54 of the outer pad 16 in the neighborhood of the through-hole 56 therein. The other end of the coil spring 62 is hooked by an edge of the outer pad guide portion 28. In other words, a portion close to the outer end of the coil spring 62 abuts the top surface 44 of the outer pad guide portion 28 while the other end of the coil spring 62 abuts the inner side surface 38 of the guide portion 28. As is clear from FIGS. 1 and 2, the torsion coil springs 62 are provided in respective outer pad guide portions 28, with the opposite ends thereof being biased in a manner as to get closer to each other. As shown in FIG. 3, a biasing force of the spring 62, which acts on the outer pad 16 and outer guide portion 28, may be divided into a force in the X direction and a force in the Y direction. The force in the Y direction which is applied to the top surface 44 of the outer pad guide portion 28 causes the bottom surface 42 of the outer pad guide portion 28 to abut the wall surface of the through-hole 56 uniformly.

On the other hand, a force in the X direction acts on the inner side surface 38 of the outer pad guide portion 28 counteracts another force in the X direction, which acts on the inner side surface 38 of another outer pad guide portion 28, thus offsetting each other. Accordingly, the forces in the X direction do not produce a large frictional resistance to the sliding movement of the outer pad to be described hereinafter. A biasing force of the torsion coil spring 62 may be set to a desired value by varying the number of coils of the coil spring.

Figure 4:
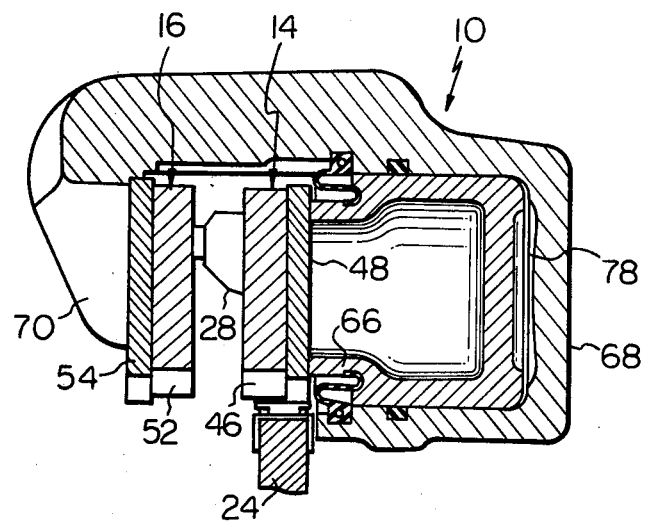
FIG. 4 is a longitudinal cross-sectional view of the disc brake of FIG. 1, excluding the brake disc.

As shown in FIG. 1, the caliper 20 includes a cylinder portion 68 admitting a piston 66 therein on one side thereof, and an outer pad abutment or abutting portion 70 spaced a distance from the cylinder portion in opposed relation thereto. In addition, the caliper 20 is further formed with sliding portions 74 having dust-proof boots 72, respectively. This makes no difference to a conventional type caliper. As shown in FIG. 4, the caliper 20 is so arranged that the piston 66 in the caliper 20 abuts the backing plate 48 of the inner pad 14, and the outer pad abutting portion 70 thereof abuts the backing plate 54 of the outer pad 16. In addition, as shown in FIG. 1, the caliper 20 is slidably supported by a pair of pins 76 which extend through the slidable portions 74, with the tip portions thereof being threaded into screw holes 34 provided in the torque bearing portion.

The operation of the disc brake 10 will be described with reference to FIG. 4. When a hydraulic pressure is applied to a pressure chamber 78 defined in the cylinder portions 68, then the piston is displaced to its extended position to the left in the drawing (FIG. 4), whereupon a reaction of the piston 66 thus being displaced causes the caliper 20 to move to the right in FIG. 4. The displacement of the piston 66 causes the inner pad 14 to slidingly move along the inner pad guide groove 30 towards one side surface 22 of the brake disc 12 (shown omitted in FIG. 4). In addition, the displacement of the caliper 20 causes the outer pad 16 to slidingly move along the outer pad guide portion 28 towards the other side surface 26 of the brake disc 12 by the force applied to the pad 16 through the medium of the abutting portion 70 of the caliper 20. As a result, the rotating brake disc 12 is braked by means of the both pads 14, 16 which press the brake disc 12 from the opposite sides thereof.

Upon braking action, high torsional moments or torque act on the both pads 14, 16. Assuming that the brake disc 12 rotates in a clockwise direction in FIG. 1, the torsional moment acting on the inner pad 14 is borne by the groove wall of the fixed portion 24 which is connected to the right one portion 28 of the portions 28, and the torsional moment acting on the outer pad 16 is borne by the other portion 28 which is provided on left side, because of clearances between each inner wall 60 of the through-holes 56 provided in the outer pad 16, and each inner side surface 38 of the outer pad guide portions 28, respectively. In this manner, the fact that loads are not concentrated on one side of the torque bearing member 18 aids in relatively increasing the strength of the member 18.

In addition, the outer pad guide portions 28 establish surface-to-surface contact with the outer pad 16 through the medium of the outer side surface 40 and outer wall 58, so that, upon braking action, a force acting on the members 16, 28 is not concentrated along a line, as in the case of the prior art disc brake, but uniformly dispersed. Even in case the outer pad slidingly moves, with the large force acting between the members 16 and 28, there will not result in local or premature wear of the abutting portions of the members 16, 28, unlike the prior art disc brake, thereby insuring smooth operation of the outer pad.

Still furthermore, the torsion coil springs 62, as has been described earlier, not only impart biasing forces to the outer pad 16, thereby preventing the rattling of the outer pad 16, upon braking action, but also urge the outer pad guide portions 28 against the bottom walls of the through-holes 56 through the bottom surfaces 42 of the portions 28, thereby preventing local wear of the bottom surfaces 42, and hence insuring smooth sliding movement of the outer pad 16.

As is apparent from the foregoing description, according to the present invention, premature or local wear of the abutting portions of the outer pad guide portions and outer pad may be effectively prevented. As a result, the smooth operation of an outer pad may be insured, with the accompanying extension of its service life.

In addition, as has been described earlier, upon braking action, a force is prevented from acting only on one side of the torque bearing member, so that the strength of the torque bearing portion may be relatively increased. Still furthermore, the torque bearing member is made of a high tension rolled metal plate, thereby contributing to saving in weight and reduction in manufacturing cost of the brake disc.

Although the present invention has been described with respect to specific details of a certain embodiment thereof, it is not intended that such details be limitations upon the scope of the invention except insofar as set forth in the following claims.

What is claimed is:

1. A disc brake comprising a brake disc having an axis of rotation;

an inner pad and an outer pad positioned on opposite sides of said brake disc, respectively;

a torque bearing member slidably supporting said pads and supporting a caliper capable of forcing said pads against said brake disc, said torque bearing member having an inner pad guide portion for guiding said inner pad along the axis of rotation of said brake disc on one side of said brake disc, a fixed portion opposed to the side of said brake disc, and a pair of outer pad guide portions extending from said fixed portion over the outer peripheral edge of said brake disc to a position beyond the other side of said brake disc;

said outer pad having a pair of through-holes or receiving portions for admitting said outer pad guide portions;

said pair of outer pad guide portions having an outer side surface and a bottom surface extending at a right angle to each other along the axis of rotation of said brake disc;

said pair of through-holes or receiving portions having sliding surfaces for abutting said outer side surface and the bottom surface of said outer pad guide portions;

said pair of outer pad guide portions being substantially of a rectangular transverse cross section defined by its outer side surface and inner side surface, said through-holes in said outer pad for admitting said guide portions being of a rectangular shape similar to the shape of said cross section, and a clearance being provided between the inner side surface of each of said outer pad guide portions and one of the walls defining each of said through-holes provided in said outer pad; and a pair of coil springs provided between said outer pad and outer pad guide portions for preventing rattling of said outer pad, one end of each said coil spring being hooked by a cut away portion provided in said outer pad, and the other end of each said coil spring being hooked by an edge of said outer pad guide portion, whereby said coil springs urge said outer pad against said outer pad guide portions.

* * * * *